United States Patent
Wagner et al.

(10) Patent No.: US 7,181,846 B2
(45) Date of Patent: Feb. 27, 2007

(54) METHOD OF MANUFACTURING A COMBINED DRIVESHAFT TUBE AND YOKE ASSEMBLY

(75) Inventors: Nelson Wagner, Holland, OH (US); Matthew P. Blecke, Toledo, OH (US)

(73) Assignee: Torque-Traction Technologies, Inc., Maumee, OH (US)

(*) Notice: Subject to any disclaimer, the term of this patent is extended or adjusted under 35 U.S.C. 154(b) by 207 days.

(21) Appl. No.: 10/886,893

(22) Filed: Jul. 8, 2004

(65) Prior Publication Data
US 2006/0005393 A1    Jan. 12, 2006

(51) Int. Cl.
  B21D 53/88    (2006.01)
  B23P 11/00    (2006.01)
  B23P 11/02    (2006.01)
  B23P 17/00    (2006.01)

(52) U.S. Cl. .................. 29/897.2; 29/506; 29/507; 29/419.2; 29/419.1

(58) Field of Classification Search .............. 29/897.2, 29/419.2, 421.1, 428, 505, 506, 507, 50–6; 72/54, 55, 56; 464/183
See application file for complete search history.

(56) References Cited

U.S. PATENT DOCUMENTS

| | | | |
|---|---|---|---|
| 3,251,974 A | 5/1966 | Seyfried | |
| 4,069,573 A | 1/1978 | Rogers, Jr. et al. | |
| 4,273,207 A * | 6/1981 | Sivers et al. | 180/380 |
| RE30,802 E | 11/1981 | Rogers, Jr. | |
| 4,327,471 A | 5/1982 | Whitted, III | |
| 4,332,073 A | 6/1982 | Yoshida et al. | |
| 4,449,281 A | 5/1984 | Yoshida et al. | |
| 4,561,799 A | 12/1985 | Arena | |
| 4,807,351 A | 2/1989 | Berg et al. | |
| 5,442,846 A | 8/1995 | Snaper | |
| 5,664,327 A | 9/1997 | Swars | |
| 5,813,264 A | 9/1998 | Steingroever | |
| 6,254,488 B1 | 7/2001 | Hill | |
| 7,080,437 B2 * | 7/2006 | da Silva et al. | 29/421.1 |
| 2005/0028341 A1 * | 2/2005 | Durand et al. | 29/421.1 |

FOREIGN PATENT DOCUMENTS

| | | |
|---|---|---|
| EP | 1350974 | 10/2003 |
| EP | 1293270 | 11/2003 |
| GB | 954752 | 4/1964 |
| JP | 61201926 | 9/1986 |
| JP | 06026526 | 2/1994 |
| JP | 11218149 | 8/1999 |

* cited by examiner

Primary Examiner—John C. Hong
(74) Attorney, Agent, or Firm—MacMillan, Sobanski & Todd, LLC

(57) ABSTRACT

A method for manufacturing a combined driveshaft tube and yoke assembly includes the initial step of orienting a first component having a first wall thickness and a second component having a second wall thickness to define an overlap region. The first and second components may have the same or different wall thicknesses, may be formed from the same or different materials, and may have the same or different lengths. Portions of the first and second components are deformed to provide the overlap region with a third wall thickness that is the sum of the first wall thickness and the second wall thickness. Lastly, a pair of yoke arms having respective openings therethrough is formed in the overlap region to provide a combined driveshaft tube and yoke assembly. A pair of combined driveshaft tube and yoke assembly can also be manufactured in accordance with this method.

30 Claims, 3 Drawing Sheets

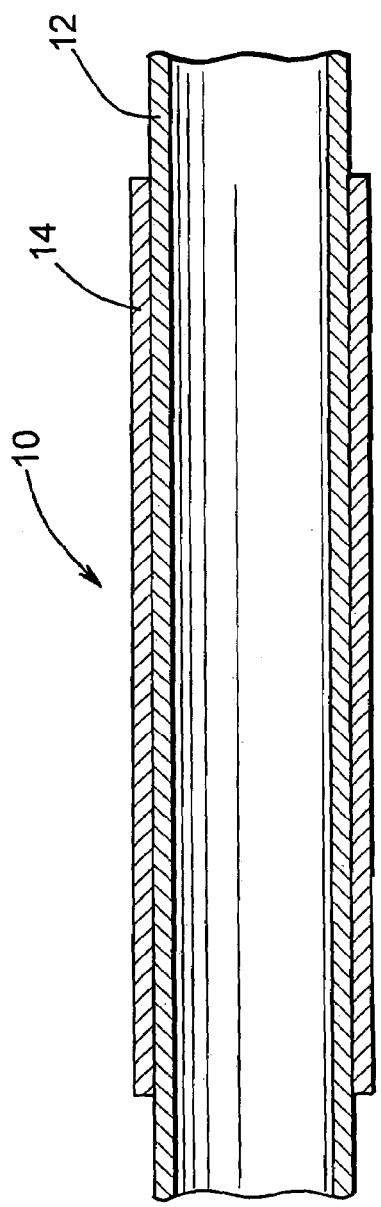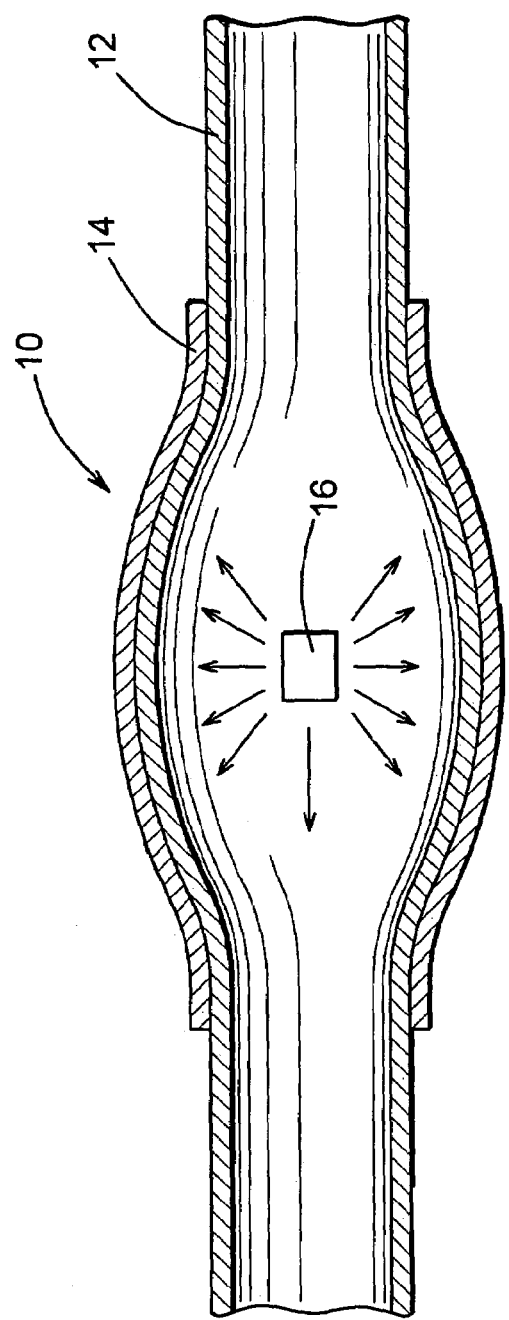

METHOD OF MANUFACTURING A COMBINED DRIVESHAFT TUBE AND YOKE ASSEMBLY

BACKGROUND OF THE INVENTION

This invention relates in general to drive train systems for transferring rotational power from a source of rotational power to a rotatably driven mechanism. In particular, this invention relates to an improved method for manufacturing a combined driveshaft tube and yoke assembly for use in such a drive train system.

Drive train systems are widely used for generating power from a source and for transferring such power from the source to a driven mechanism. Frequently, the source generates rotational power, and such rotational power is transferred from the source to a rotatably driven mechanism. For example, in most land vehicles in use today, an engine/transmission assembly generates rotational power, and such rotational power is transferred from an output shaft of the engine/transmission assembly through a driveshaft assembly to an input shaft of an axle assembly so as to rotatably drive the wheels of the vehicle. To accomplish this, a typical driveshaft assembly includes a hollow cylindrical driveshaft tube having a pair of end fittings, such as a pair of tube yokes, secured to the front and rear ends thereof. The front end fitting forms a portion of a front universal joint that connects the output shaft of the engine/transmission assembly to the front end of the driveshaft tube. Similarly, the rear end fitting forms a portion of a rear universal joint that connects the rear end of the driveshaft tube to the input shaft of the axle assembly. The front and rear universal joints provide a rotational driving connection from the output shaft of the engine/transmission assembly through the driveshaft assembly to the input shaft of the axle assembly, while accommodating a limited amount of angular misalignment between the rotational axes of these three shafts.

As mentioned above, a typical driveshaft assembly includes a hollow cylindrical driveshaft tube having a pair of end fittings, such as a pair of tube yokes, secured to the front and rear ends thereof. Traditionally, the tube yokes have been formed by forging or casting and have been secured to the ends of the driveshaft by welding or adhesives. Although this method has been effective, it would be desirable to provide an improved method for manufacturing a combined driveshaft tube and yoke assembly for use in a drive train system that avoids the use of welding or adhesives.

SUMMARY OF THE INVENTION

This invention relates to an improved method for manufacturing a combined driveshaft tube and yoke assembly, such as for use in a vehicular drive train system. Initially, a first component having a first wall thickness and a second component having a second wall thickness are oriented to define an overlap region. The first and second components may have the same or different wall thicknesses, may be formed from the same or different materials, and may have the same or different lengths. Portions of the first and second components are deformed to provide the overlap region with a third wall thickness that is the sum of the first wall thickness and the second wall thickness. Lastly, a pair of yoke arms having respective openings therethrough is formed in the overlap region to provide a combined driveshaft tube and yoke assembly. A pair of combined driveshaft tube and yoke assembly can also be manufactured in accordance with this method.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a sectional elevational view of a workpiece that can be used to manufacture a combined driveshaft tube and yoke assembly, such as for use in a vehicular drive train system, in accordance with the method of this invention.

FIG. 2 is a sectional elevational view of the workpiece illustrated FIG. 1 shown in a second stage of manufacture in accordance with the method of this invention.

DETAILED DESCRIPTION OF THE PREFERRED EMBODIMENT

Figure 3:
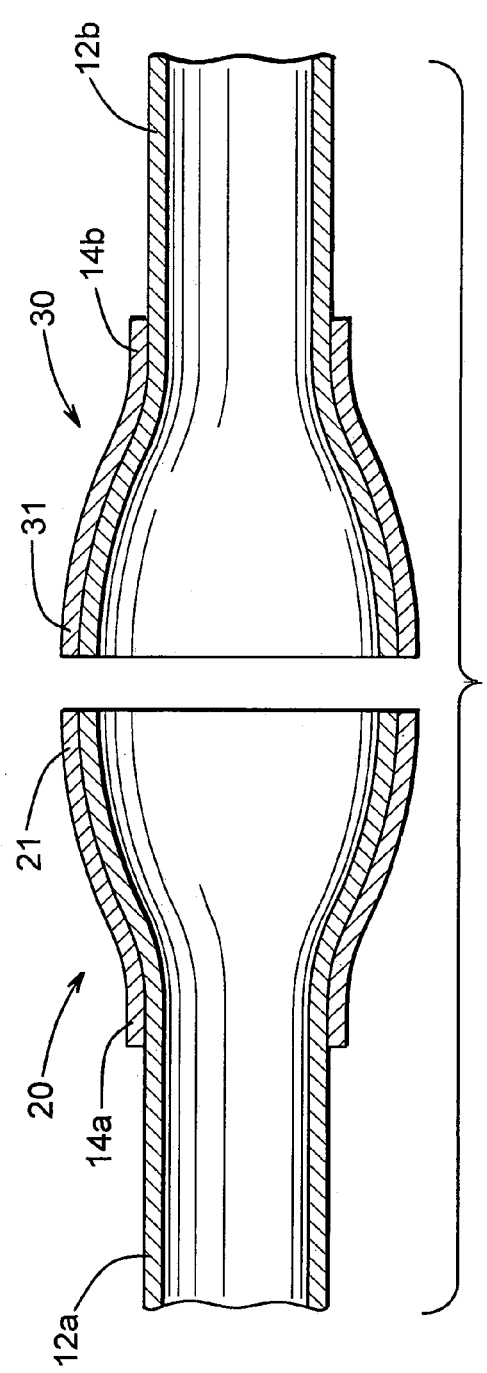
FIG. 3 is a sectional elevational view of the workpiece illustrated FIG. 2 shown in a third stage of manufacture in accordance with the method of this invention.

Referring now to the drawings, there is illustrated in FIGS. 1 through 5 a first embodiment of a method for manufacturing a combined driveshaft tube and yoke assembly, such as for use in a vehicular drive train system, in accordance with this invention. Initially, as shown in FIG. 1, a workpiece, indicated generally at 10, is provided that includes first and second components 12 and 14. The illustrated first component 12 is a hollow cylindrical tube having a relatively long length. However, the first component 12 may be formed having any desired cross sectional shape or shapes and may be formed having any desired length. The illustrated second component 14 is a hollow cylindrical tube having a relatively short length. However, the second component 14 may also be formed having any desired cross sectional shape or shapes and may be formed having any desired length. The first and second components 12 and 14 may be formed from any desired material or combination of materials. For example, the first and second components 12 and 14 may be formed from metallic materials, such as steel, aluminum, and the like.

In the illustrated embodiment, the second component 14 is positioned about an intermediate portion of the first component 12. As will be described more fully below, such intermediate positioning is desirable to utilize the method of this invention to form two combined driveshaft tube and yoke assemblies in accordance with the method of this invention. However, the second component 14 may be positioned at any desired location relative to the first component 12, such as adjacent to an end thereof. As will also be described more fully below, such end positioning is desirable to utilize the method of this invention to form a single combined driveshaft tube and yoke assembly in accordance with the method of this invention.

Preferably, the outer surface of the first component 12 is slightly smaller than the inner surface of the second component 14. As a result, the second component 14 can be positioned concentrically about the first component 12 quickly and easily, as shown in FIG. 1. However, if desired, the outer surface of the second component 14 may be slightly smaller than the inner surface of the first component 12. In this instance, the first component 12 can be positioned concentrically about the second component 14 quickly and easily. In either event, the first and second components can be positioned relative to one another by any desired means.

When the second component 14 is positioned about the first component 12, an overlap region therebetween is defined by the axially overlapping portions of the first and second components 12 and 14. The first component 12 has a first wall thickness or thicknesses in the overlap region, and the second component 14 has a second wall thickness or thicknesses in the overlap region. The first wall thickness or thicknesses of the first component 12 may be the same or different from the second wall thickness or thicknesses 14 of the second component as desired. However, in the overlap region the first and second components 12 and 14 define a third wall thickness or thicknesses that is the sum of the first wall thickness or thicknesses of the first component 12 and the second wall thickness or thicknesses of the second component 14.

FIG. 2 illustrates the workpiece 10 after a deformation operation has been performed on portions of the first and second components 12 and 14 so as to provide a second stage of manufacture in accordance with the method of this invention. In the illustrated embodiment, the deformation operation is performed by a force generator, schematically illustrated at 16, that is disposed within the first and second components 12 and 14, causing them to be expanded outwardly. The force generator 16 can be embodied as any desired apparatus or process that is capable of generating a sufficient amount of force as to deform the overlapping portions of the first and second components 12 and 14 to achieve the desired second stage of manufacture. For example, the force generator 16 may be an inductor, which can be used in a conventional magnetic pulse forming process to deform the overlapping portions of the first and second components 12 and 14. Alternatively, the force generator 16 may be fluid pressure, which can be used in a conventional hydroforming process to deform the overlapping portions of the first and second components 12 and 14.

The overlapping portions of the first and second components 12 and 14 can be deformed to have any desired shape or shapes. Preferably, however, the first and second components 12 and 14 are deformed in such a manner that the deformed portions thereof are mechanically engaged with one another so as to provide essentially a fixed or unitary relationship therebetween. As a result, the deformed portions of the first and second components 12 and 14 result in a dual thickness region of the workpiece 10 that has increased strength over the individual strengths of the separate first and second components 12 and 14. If desired, portions of the first and second components 12 and 14 can be positively secured together, such as by welding, adhesive, and the like, although such is not required. This positive securement step, if it is performed at all, may be performed before the deformation step, after the deformation step, or at any desired point in the method of manufacture.

Next, as shown in FIG. 3, the workpiece 10 can be divided into first and second preforms, indicated generally at 20 and 30, respectively. This can be accomplished in any desired manner, but preferably is performed by a conventional cutting apparatus, such as a mechanical or laser cutter. In the illustrated embodiment, the cutting operation is performed at the center point of the overlap region of the first and second components 12 and 14, thus dividing the first and second components 12 and 14 into respective component sections 12a, 12b and 14a, 14b. As a result, the first and second preforms 20 and 30 have essentially the same size and shape. However, the cutting operation can be performed at any desired point of the overlap region of the first and second components 12 and 14 so that the first and second preforms 20 and 30 will have different sizes or shapes. In either event, the resultant first and second preforms 20 and 30 have respective end portions 21 and 31 of increased thickness and strength.

Figure 4:
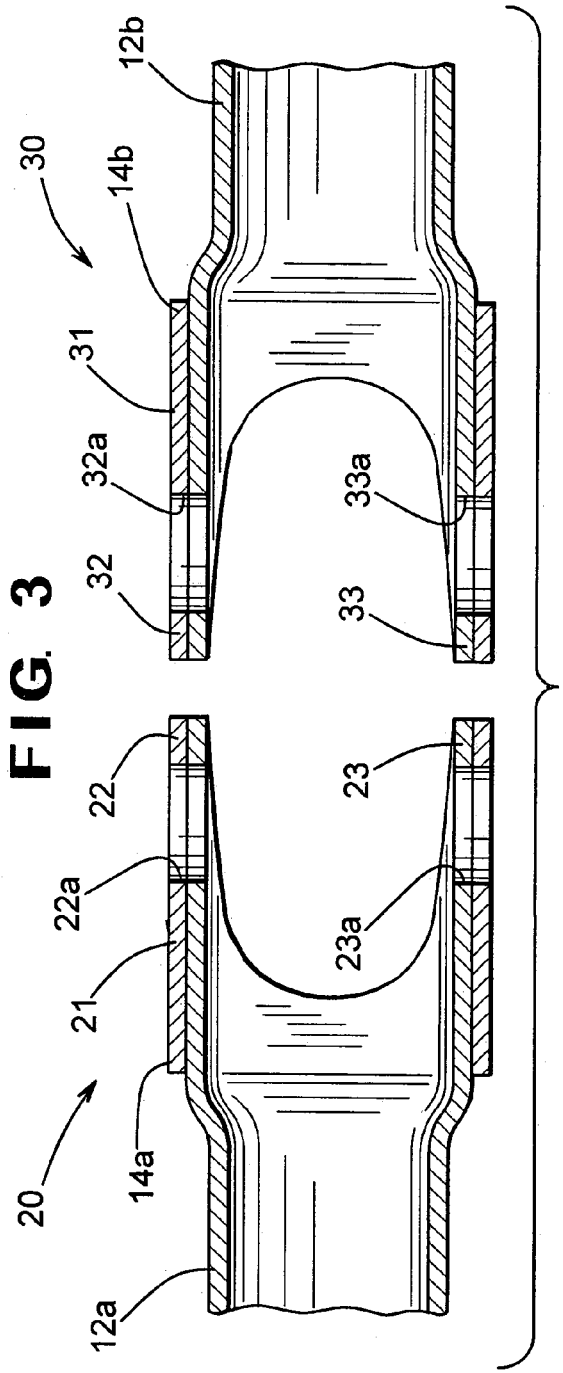
FIG. 4 is a sectional elevational view of the workpiece illustrated FIG. 3 shown in a final stage of manufacture in accordance with the method of this invention.

FIG. 4 illustrates the first and second preforms 20 and 30 after they have each been subjected to another deformation process to re-shape the end portions 21 and 31 to respective desired configurations. As shown therein, the end portion 21 of the first preform 20 has been re-shaped to have a generally rectangular cross sectional shape relative to the generally circular cross sectional shape of the original workpiece 10. However, the end portion 21 of the first preform 20 can be re-shaped to have any desired shape. Similarly, the end portion 31 of the second preform 30 has also been re-shaped to have a generally rectangular cross sectional shape relative to the generally circular cross sectional shape of the original workpiece 10. However, the end portion 31 of the second preform 30 can also be re-shaped to have any desired shape.

Figure 5:
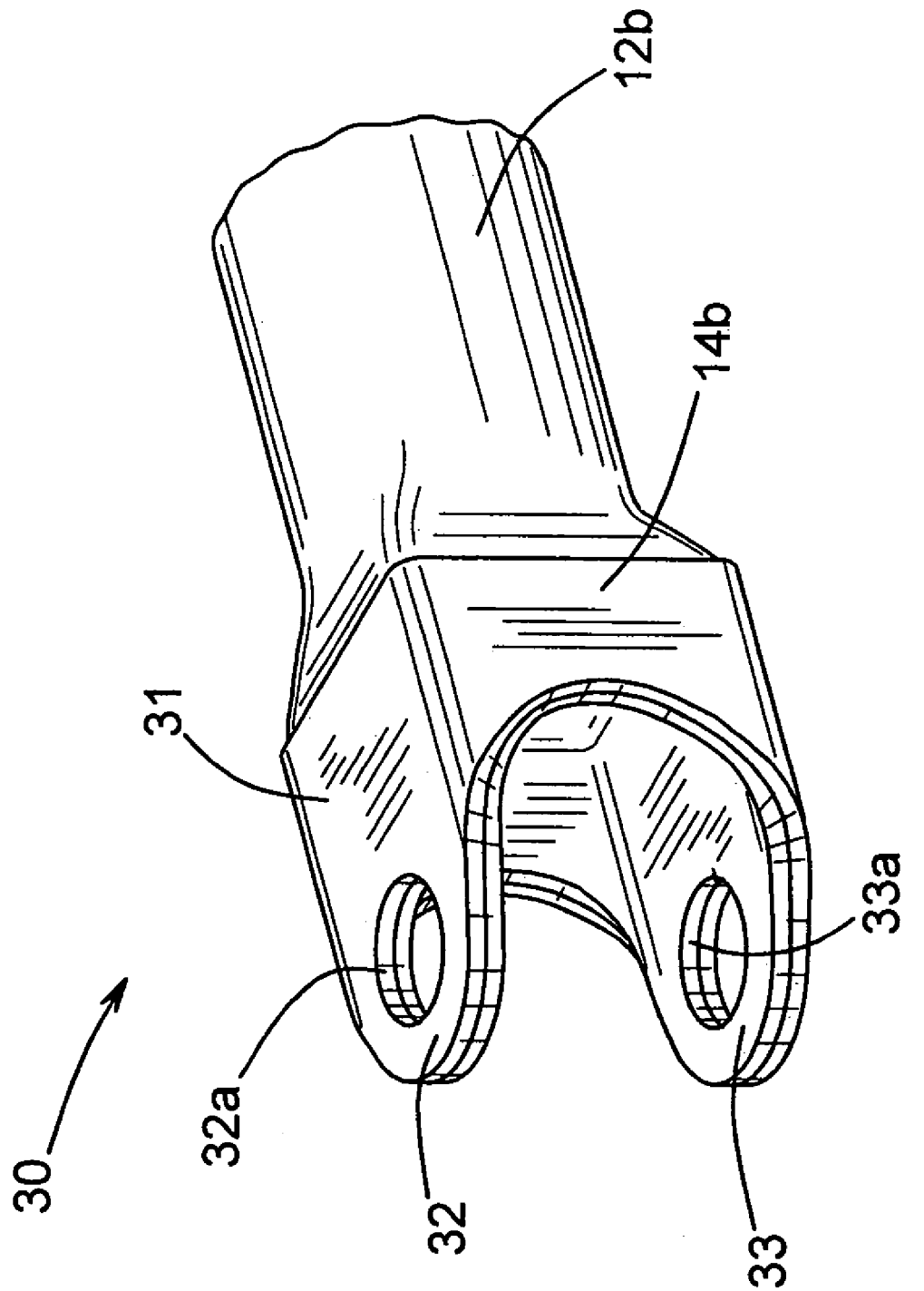
FIG. 5 is a perspective view of the workpiece illustrated FIG. 4 shown in the final stage of manufacture in accordance with the method of this invention.

Following these deformation processes, the end portion 21 of the first preform 20 is subjected to a material removing process to provide first and second yoke arms 22 and 23 having respective openings 22a and 23a formed therethrough, as shown in FIG. 4. To accomplish this, portions of the end portion 21 of the first preform 20 have been removed to define the yoke arms 22 and 23. The removal of these portions of the end portion 21 of the first preform 20 can be performed by any conventional cutting apparatus, such as a mechanical or laser cutter. As a result, the first preform 20 is manufactured into a first combined driveshaft tube and yoke assembly. Similarly, the end portion 31 of the second preform 30 is also subjected to a material removing process to provide first and second yoke arms 32 and 33 having respective openings 32a and 33a formed therethrough, as shown in FIGS. 4 and 5. To accomplish this, portions of the end portion 31 of the second preform 30 have been removed to define the yoke arms 32 and 33. The removal of these portions of the end portion 31 of the second preform 30 can be performed by a conventional cutting apparatus, such as a mechanical or laser cutter. As a result, the second preform 30 is manufactured into a second combined driveshaft tube and yoke assembly.

Following its formation in the manner described above, each of the combined driveshaft tube and yoke assemblies can be subjected to one or more finishing operations to precisely define the shape thereof. When finished, each of the combined driveshaft tube and yoke assemblies can function as a conventional combined driveshaft and yoke assembly. For example, two of such combined driveshaft tube and yoke assemblies can be connected together by a conventional universal joint cross (not shown) to provide two driveshaft sections having a rotational driving connection therebetween that can accommodate a limited amount of angular misalignment between the rotational axes thereof. Typically, the cross includes a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or other friction-reducing structures are provided between the outer cylindrical surfaces of the trunnions and the inner cylindrical surfaces of the bearing cups to permit rotational movement of the bearing cups relative to the trunnions during operation of the universal joint. The bearing cups supported on the first opposed pair of the trunnions on the cross can be received within the aligned openings 22a and 23a formed through the yoke arms 22 and 23 of the first combined driveshaft tube and yoke assembly 20, while the bearing cups supported on the second opposed pair of the trunnions on the cross can be received within the aligned openings 32a and 33a formed through the yoke arms 32 and 33 of the second combined driveshaft tube and yoke assembly 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method for manufacturing a combined driveshaft tube and yoke assembly comprising the steps of:
   (a) orienting a first component having a first wall thickness and a second component having a second wall thickness to define an overlap region;
   (b) deforming the first and second components to provide the overlap region having a third wall thickness that is the sum of the first wall thickness and the second wall thickness; and
   (c) forming a pair of yoke arms having respective openings therethrough in the overlap region to provide a combined driveshaft tube and yoke assembly.

2. The method defined in claim 1 wherein said step (a) is performed by providing the first and second components having the same wall thicknesses.

3. The method defined in claim 1 wherein said step (a) is performed by providing the first and second components having different wall thicknesses.

4. The method defined in claim 1 wherein said step (a) is performed by providing the first and second components from the same material.

5. The method defined in claim 1 wherein said step (a) is performed by providing the first and second components from different materials.

6. The method defined in claim 1 wherein said step (a) is performed by providing the first component having a first length and by providing the second component having a second length that is different from the first length.

7. The method defined in claim 6 wherein said step (a) is performed by disposing the first component about the second component.

8. The method defined in claim 6 wherein said step (a) is performed by disposing the first component within the second component.

9. The method defined in claim 1 wherein said step (b) is performed by one of magnetic pulse forming and hydroforming processes.

10. The method defined in claim 1 wherein said step (c) is performed by one of mechanical and laser cutting processes.

11. A method for manufacturing a pair of combined driveshaft tube and yoke assemblies comprising the steps of:
    (a) orienting a first component having a first wall thickness and a second component having a second wall thickness to define an overlap region;
    (b) deforming the first and second components to provide the overlap region having a third wall thickness that is the sum of the first wall thickness and the second wall thickness;
    (c) dividing the overlap region to provide first and second preforms, each of the preforms having an end portion; and
    (c) forming a pair of yoke arms having respective openings therethrough in the end portion of each of the first and second preforms to provide a pair of combined driveshaft tube and yoke assemblies.

12. The method defined in claim 11 wherein said step (a) is performed by providing the first and second components having the same wall thicknesses.

13. The method defined in claim 11 wherein said step (a) is performed by providing the first and second components having different wall thicknesses.

14. The method defined in claim 11 wherein said step (a) is performed by providing the first and second components from the same material.

15. The method defined in claim 11 wherein said step (a) is performed by providing the first and second components from different materials.

16. The method defined in claim 11 wherein said step (a) is performed by providing the first component having a first length and by providing the second component having a second length that is different from the first length.

17. The method defined in claim 16 wherein said step (a) is performed by disposing the first component about the second component.

18. The method defined in claim 16 wherein said step (a) is performed by disposing the first component within the second component.

19. The method defined in claim 11 wherein said step (b) is performed by one of magnetic pulse forming and hydroforming processes.

20. The method defined in claim 11 wherein said step (c) is performed by one of mechanical and laser cutting processes.

21. The method defined in claim 11 wherein said step (a) is performed by providing the first and second components from different materials.

22. A method for manufacturing a pair of driveshafts comprising the steps of:
    (a) orienting a first component having a first wall thickness and a second component having a second wall thickness to define an overlap region;
    (b) deforming the first and second components to provide the overlap region having a third wall thickness that is the sum of the first wall thickness and the second wall thickness;
    (c) dividing the overlap region to provide first and second driveshafts, each of the driveshafts having an end portion having the third wall thickness; and
    (d) re-shaping the end portions of the driveshafts to provide respective desired configurations.

23. The method defined in claim 22 wherein said step (a) is performed by providing the first and second components having the same wall thicknesses.

24. The method defined in claim 22 wherein said step (a) is performed by providing the first and second components having different wall thicknesses.

25. The method defined in claim 22 wherein said step (a) is performed by providing the first and second components from the same material.

26. The method defined in claim 22 wherein said step (a) is performed by providing the first component having a first length and by providing the second component having a second length that is different from the first length.

27. The method defined in claim 26 wherein said step (a) is performed by disposing the first component about the second component.

28. The method defined in claim 26 wherein said step (a) is performed by disposing the first component within the second component.

29. The method defined in claim 22 wherein said step (b) is performed by one of magnetic pulse forming and hydroforming processes.

30. The method defined in claim 22 wherein said step (c) is performed by one of mechanical and laser cutting processes.

* * * * *